May 23, 1944.    J. R. CAMPBELL    2,349,612
HEATING DEVICE
Filed Feb. 23, 1943

Inventor:
James R. Campbell,
by Harry E. Dunham
His Attorney.

Patented May 23, 1944

2,349,612

UNITED STATES PATENT OFFICE 2,349,612

HEATING DEVICE

James R. Campbell, Ontario, Calif., assignor to General Electric Company, a corporation of New York Application February 23, 1943, Serial No. 476,825

6 Claims. (Cl. 219—46)

This invention relates to heating devices, more particularly to heating pads, and it has for its object the provision of an improved, simplified and reliable control device for the pad for controlling its energization so as to hold different selected temperatures in the pad.

In accordance with this invention, I provide the pad with a thermally responsive element arranged to control the energization of the heating pad circuit responsively to the pad temperature. In order to control the pad temperature, I provide auxiliary heating means for supplying heat to the temperature responsive element in addition to that which it receives from the pad. By controlling the amount of heat supplied to the element from the auxiliary source, the pad temperature is controlled.

For thus controlling the auxiliary heat, the temperature responsive element is provided with a plurality of sections having different heating agencies. These agencies operate selectively, and each functions to deflect the thermally-responsive element at its own particular rate so as to control the proportion of time that power is supplied to the pad to the time that it is not supplied, and thereby control the pad temperature. Switch means are provided for selectively rendering these sections operative to control the operation of the temperature responsive element so that the temperature at which the pad operates can be selected at will.

Figure 1:
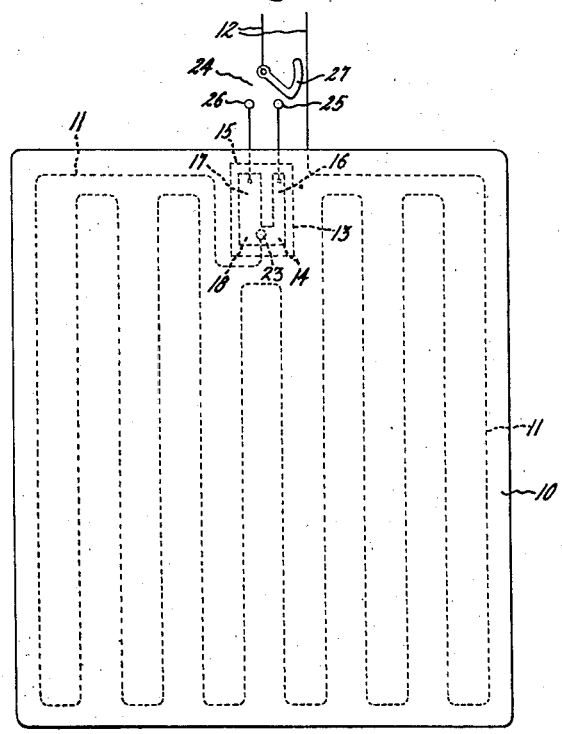
Figure 2:
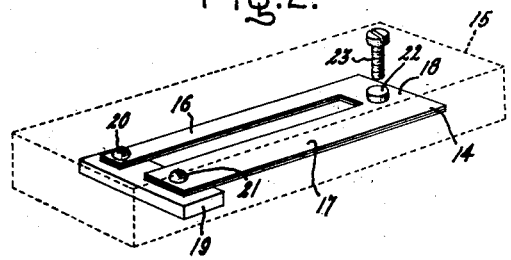

For a more complete understanding of this invention, reference should be had to the accompanying drawing in which Fig. 1 illustrates an electric heating pad provided with a temperature control device embodying this invention; and Fig. 2 is an enlarged view of the temperature controlling element of the pad.

Referring to the drawing, this invention has been shown in one form as applied to an electric heating pad 10 which is provided with a resistance conductor 11 forming a heating circuit for the pad. The resistance conductor 11 is formed into a series of convolutions, as shown, so as to distribute the generated heat over the pad area.

The pad is supplied with electrical power from an electrical supply source 12. Embedded in the pad so as to respond to its temperature, and interposed in the electrical connections between the circuit 11 and the supply source 12 is a thermally responsive control device 13 constructed and arranged in accordance with this invention. The control device 13 comprises a temperature-responsive element 14 which preferably will be mounted in a suitable housing 15 indicated by dotted lines. The temperature-responsive element 14 is of the bimetallic type, being formed by two strips of metal having dissimilar temperature coefficients of expansion and secured together lengthwise in any suitable way as by welding. The upper section of the element, as viewed in Fig. 2, is formed of the metal having the higher temperature coefficient of expansion so that when the element is heated it will deflect downwardly, and when permitted to cool it will deflect upwardly.

The temperature-responsive element 14 has a U-shape being formed with a pair of legs 16 and 17 and a nexus 18 connecting the legs at one end. The opposite ends of the legs are rigidly secured to an electrically insulating supporting member 19 mounted in the casing 15. It may be secured in any suitable way, but preferably will be attached by means of screw fastening means 20 and 21. The nexus 18 carries a movable contact 22 which coacts with a fixed contact 23 that is adjustable with reference to the thermal blade. The contacts 22 and 23 are arranged to control the energization of the heating circuit 11 of the pad responsively to the deflection of the thermostatic element 14.

The thermostatic element 14 responds both to the temperature of the pad itself and also to its own heating agency, and it is preferably heated by the passage of electrical current through it; in other words, it is an electro-thermally responsive element. And the two legs 16 and 17 constitute two operating sections for the thermostat which will move it to open and close the switch at different rates to thereby vary the power input to the pad 10 and consequently the temperature held in it. As shown, the leg 16 has a relatively small cross-section as compared with the leg 17 and, therefore, its electrical resistance is higher than that of the leg 17.

It is contemplated in the operation of the device that one, or the other, or both of the legs connected in parallel will be connected in series with the heating circuit 11 so as to control its energization. For this purpose, a manually controllable switch 24 is interposed in the connections leading from the source 12 to the pad; it is provided with a pair of fixed contacts 25 and 26 and a movable contact 27. The movable contact 27 may engage either the contact 25, or the contact 26, or it may bridge them. The fixed contact 27 is connected to one side of the supply source, the left-hand side as viewed in Fig. 1 whereas the two contacts 25 and 26 are connected to the fixed ends respectively of the two legs 16 and 17, as shown. The other side of the supply source is connected to one side of the heating circuit 11, whereas the other side of this circuit is connected to the fixed contact 33.

In operation, when the switch contact 27 is in its open position, as shown in Fig. 1, the pad 10 will be deenergized. If the switch contact 27 is moved to close the contact 25, the high resistance leg 16 will be connected in series with the heating pad circuit, because at this time the thermal element 14 will be cold and the switch contacts 22 and 23 will be closed. Inasmuch as this is the high resistance path, the thermal element 14 will be quickly heated to a predetermined high temperature both by the heat imparted to it from the pad and that generated internally in the leg 16. When the thermal element reaches this temperature it will open the contacts 22 and 23 which operation will de-energize the thermal element, and at the same time will shut off the power from the pad 10. Then the pad will cool, and so will the section 16; and when the thermal element reaches a predetermined low temperature it will reclose the contacts 22 and 23 to reenergize itself and also the pad circuit 11. In this way, the control device operates alternately to supply power to the pad 10 and to shut it off from the pad. The proportion of time that power is supplied to the time that it is shut off determines the temperature that will be held in the pad. And inasmuch as the section 16 has a high resistance the proportion of time that power is supplied to the time that it is not supplied is relatively small and the pad operates at its lowest temperature setting.

If it be desired to operate the pad at a higher temperature, the switch contact 27 is moved to close the contact 26 alone. This connects the low resistance section 17 in series with the pad circuit, and the control device operates in the manner previously described, except that the thermal element 14 is heated relatively slowly by the pad and by the low resistance section 17. And the proportion of time that power is supplied to the pad 10 to the time that it is not supplied is greater. Consequently, the pad operates at a higher temperature.

A still higher pad-operating temperature may be obtained by moving the contact 27 to bridge the contacts 25 and 26. This connects the two resistance sections 16 and 17 in parallel with each other and the two together in series circuit relation with the heating circuit 11. This produces a minimum heating effect for the thermal element so that it is very slowly heated to open the circuit. Consequently, the proportion of time that the power is supplied to the time that it is not supplied is the greatest and the pad will operate at its maximum temperature.

It will be observed that I have provided a very simple and reliable construction for controlling the heating pad 10 to give it three operating temperatures.

While I have shown and described a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In an electrically heated device having a heating circuit, a control device therefor comprising a thermally-responsive element responsive to the temperature of said device and having a plurality of thermally-responsive sections that are connected to deflect in unison responsively to temperature changes and including means for heating said thermally-responsive element at different rates to cause movement thereof, means for selectively rendering said sections effective to control said thermally-responsive element, and means controlled by movements of said thermally-responsive element for controlling the energization of said heating circuit.

2. In an electrically heated device having a heating circuit, a control device for said heating circuit comprising a thermally-electric responsive element located to respond to the temperature of said device and having a plurality of thermally-responsive sections connected to deflect in unison responsively to temperature changes, and each different section when conducting electric current being heated at a different rate than the remainder, and means for selectively connecting said sections in said heating circuit so that they are heated by the passage of electric current therethrough.

3. In an electric heating pad having a heating circuit, a control device for said heating pad comprising a temperature responsive bar responsive to the temperature of said pad and having a plurality of mechanically interconnected legs which move in unison in one direction when the bar is heated and in another direction when the bar is cooled, said legs having different electrical resistances, means for selectively connecting said legs in said heating circuit so that said bar is heated to move in said one direction at different rates, and means controlled by said bar in moving in said one direction to reduce the power supplied in said circuit and thereby its heating effect, and in moving in said other direction to increase the power supplied in said circuit and thereby its heating effect.

4. In an electric heating pad having a heating circuit, a control device for said circuit comprising an electro-responsive thermostatic switch connected in said circuit arranged when closed to supply power to said circuit and when opened to shut off the power to said circuit, and said switch having a plurality of thermally-responsive sections that respond to the temperature of said pad and which deflect to open said switch when heated and to reclose said switch when subsequently cooled, said sections having different electrical resistances, and switching means for selectively connecting said sections in said circuit, one at a time, or all simultaneously, so that said thermostatic switch is operated at different rates to hold different temperatures in said pad.

5. In a heating pad having a heating circuit, a control device for said circuit comprising a U-shaped bimetallic bar responsive to the temperature of said pad, the two legs of said bar having different electrical resistances, a switch in said circuit opened when said bar is heated to a predetermined high temperature to shut off the power to said pad and closed when said bar is cooled to a predetermined low temperature to reapply power to said pad, and switching means for connecting one or the other of said legs in series with said circuit or the two in parallel in series with said circuit so that said bar periodically operates said switch to open and close at three different rates to hold three different temperature conditions in said pad.

6. In a heating pad having a heating circuit, a control device for said circuit comprising a bimetallic bar responsive to the temperature of said pad and controlling said circuit to cut down the heat when the bar is heated to a predetermined high temperature and to increase the heat when the bar cools down to a predetermined low temperature, said bimetallic bar having a pair of legs, means anchoring corresponding ends of said legs, the other ends of the legs being free to deflect responsively to temperature changes and said latter ends being connected to move together, said legs having different electrical resistances, and switching means for connecting one or the other of said legs in series with said circuit or the two legs in parallel in series with said circuit so that said bar periodically operates said switch to open at different rates thereby to hold different temperature conditions.

JAMES R. CAMPBELL.